United States Patent
Cesare et al.

(10) Patent No.: US 8,196,153 B1
(45) Date of Patent: Jun. 5, 2012

(54) METHOD AND APPARATUS FOR ASSOCIATING DEVICE DRIVERS VIA A DEVICE TREE

(75) Inventors: Joshua de Cesare, Campbell, CA (US); Simon Douglas, Cupertino, CA (US); Alexei Elias Kosut, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1081 days.

(21) Appl. No.: 11/620,696

(22) Filed: Jan. 7, 2007

(51) Int. Cl. *G06F 3/038* (2006.01)

(52) U.S. Cl. ............... 719/321; 719/327; 710/8; 710/10

(58) Field of Classification Search .................. None
See application file for complete search history.

(56) References Cited

U.S. PATENT DOCUMENTS

| | | | | |
|---|---|---|---|---|
| 5,555,401 | A | * | 9/1996 | Allen et al. ............... 710/8 |
| 5,630,076 | A | * | 5/1997 | Saulpaugh et al. ....... 710/104 |
| 5,809,331 | A | * | 9/1998 | Staats et al. ............. 710/10 |
| 6,189,050 | B1 | | 2/2001 | Sakarda |
| 6,393,557 | B1 | | 5/2002 | Guthridge et al. |
| 6,904,477 | B2 | * | 6/2005 | Padmanabhan et al. ...... 710/74 |
| 7,203,774 | B1 | | 4/2007 | Zhou et al. |
| 7,506,343 | B2 | * | 3/2009 | Aslot et al. ............ 719/324 |
| 7,793,279 | B1 | * | 9/2010 | Le et al. ............... 717/168 |
| 2002/0004852 | A1 | * | 1/2002 | Sadovsky et al. ....... 709/321 |
| 2002/0059474 | A1 | * | 5/2002 | Camara et al. .......... 709/321 |
| 2003/0233487 | A1 | * | 12/2003 | Ruget et al. ............ 709/321 |
| 2004/0064828 | A1 | | 4/2004 | Cox |
| 2004/0199920 | A1 | * | 10/2004 | Resch .................. 719/310 |
| 2004/0224638 | A1 | | 11/2004 | Fadell et al. |
| 2007/0136778 | A1 | | 6/2007 | Birger et al. |

FOREIGN PATENT DOCUMENTS

EP 1056001 11/2000

OTHER PUBLICATIONS

IEEE Standard for Boot (Initialization Configuration) Firmware: Core Requirements and Practices, Published by the Institute of Electrical and Electronics Engineers, Inc., 345 East 47th Street, New Yoirk, NY 10017, USA. Oct. 28, 1994, 269 pages.

* cited by examiner

*Primary Examiner* — Andy Ho
*Assistant Examiner* — Shih-Wei Kraft
(74) *Attorney, Agent, or Firm* — Blakely, Sokoloff, Taylor & Zafman LLP

(57) ABSTRACT

Techniques for associating device drivers via a device tree are described herein. In one embodiment, a device tree having a hierarchical structure is maintained by a kernel of an operating system. The device tree includes device nodes corresponding to devices installed in a computer, including a first node and a second node. An auxiliary driver identifier is encoded within the first node for identifying a second device driver associated with the second node. The auxiliary driver identifier is used by a first device driver associated with the first node to invoke the second device driver to perform a predetermined operation on a device associated with the first node. Other methods and apparatuses are also described.

20 Claims, 18 Drawing Sheets

| Device Identifier 351 | Device Driver Identifier 352 |
|---|---|
| ... | ... |
| ... | ... |
| Device Name 304 | Device Driver Handle 313 |
| ... | ... |
| ... | ... |

| Device Identifier | Device Driver Identifier |
|---|---|
| ... | ... |
| SOC Controller | SOC Driver Handle |
| I2S Controller | I2S Driver Handle |
| I2C Controller | I2C Driver Handle |
| Audio0 | Audio Driver Handle |
| ... | ... |

FIG. 5C

```
IOManager::Initialize()
{
    ...
    pDriverObj = new DriverObj();

if (pDriverObj == pDriverObj->Probe())
        pDriverObj->Start();
    else
        delete pDriverObj;

```
DrverObj::Probe()
{
    ...
    getProperty (this, &DeviceName);

return FindCo-provider(this, DeviceName);
}
```

FIG. 7B

```
FindCo-provider(pNewDriverObj, DeviceName)
{
        ...
        pDriverObj = LookupDictionary (DeviceName);

if (pDriverObj != NULL)
                return pDriverObj;
        else
        {
                InsertDictionary (DeviceName, pNewDriverObj);
                return pNewDriverObj;
        }

```
Class DrverObj
{
        ...
        int Init();

pDriverHandle Probe(DeviceName, pDriverHandle);

int Start();
}
```

FIG. 7D

METHOD AND APPARATUS FOR ASSOCIATING DEVICE DRIVERS VIA A DEVICE TREE

FIELD OF THE INVENTION

The present invention relates generally to data processing systems. More particularly, this invention relates to associating device drivers in a data processing system using a device tree.

BACKGROUND

Data processing systems, such as, computer systems, are composed of a variety of different components or "devices" that operate together to form the resultant system. Typically, some of the devices are supplied with the computer system initially, such as a central processing unit and a communication bus, and some devices can be installed into the computer system after the initial configuration of the system. In any event, in the general case, each device has an associated driver that, among other functions, configures the device and allows the device to be operable within the overall system. Drivers are typically software instructions that can be loaded into the computer system's memory and when executed will communicate with the device to properly configure the device for operation. The driver may initialize the device so that the device can function and the driver may also allow the device to communicate normally within the overall system.

In certain system configurations, a device driver may support multiple devices. During the initialization of a computer system, the system may enumerate the devices installed within the system. As a result, multiple instances of a driver may be loaded to support multiple devices. In order to avoid loading multiple instances of the same driver, in the past, a driver developer had to know how to determine whether another instance of the same driver is loaded. For example, when an instance of a driver is initialized, the driver has to acquire a lock to a device dictionary maintained by a kernel of an operating system to prevent others from accessing the same. Once the driver acquires the lock, the driver accesses the dictionary to determine whether another instance of the device driver has already registered its driver handle. If not, the current instance of driver registers with the dictionary by inserting its driver handle. If there is a previous driver registered with the dictionary, the current instance of the driver may unload itself. Thus, this is a first-come-first-serve situation where multiple instances of the same driver race to acquire the lock and register with the dictionary. In addition, a driver has to maintain the dictionary. Such a mechanism is relatively complicated and inconvenient, and an author of a device driver must write this software each time they write a driver.

Further, in certain situations, a driver may have to invoke another driver to perform certain functionalities that the driver is not capable of doing so. In the past, one driver has to call another driver via a communication protocol, such as, those described in IEEE 1275 finnware standard ("IEEE Standard for Boot (Initialization Configuration) Firmware: Core Requirements and Practices" IEEE Std 1275-1994, Oct. 28, 1994, pp. 1-262), which requires a driver developer to fully understand such a protocol and the system software has to fully support it.

SUMMARY OF THE DESCRIPTION

Techniques for associating device drivers via a device tree are described herein. In one embodiment, a device tree having a hierarchical structure is maintained by a kernel of an operating system. The device tree includes device nodes corresponding to devices installed in a computer, including a first node and a second node. An auxiliary driver identifier is encoded within the first node for identifying a second device driver associated with the second node. The auxiliary driver identifier is used by a first device driver associated with the first node to invoke the second device driver to perform a predetermined operation on a device associated with the first node.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3B is diagram illustrating an example of a dictionary according to one embodiment.

FIG. 5C is a block diagram illustrating the corresponding dictionary maintained by the kernel.

FIGS. 7A-7D illustrate pseudo codes of certain routines according to certain embodiments of the invention.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
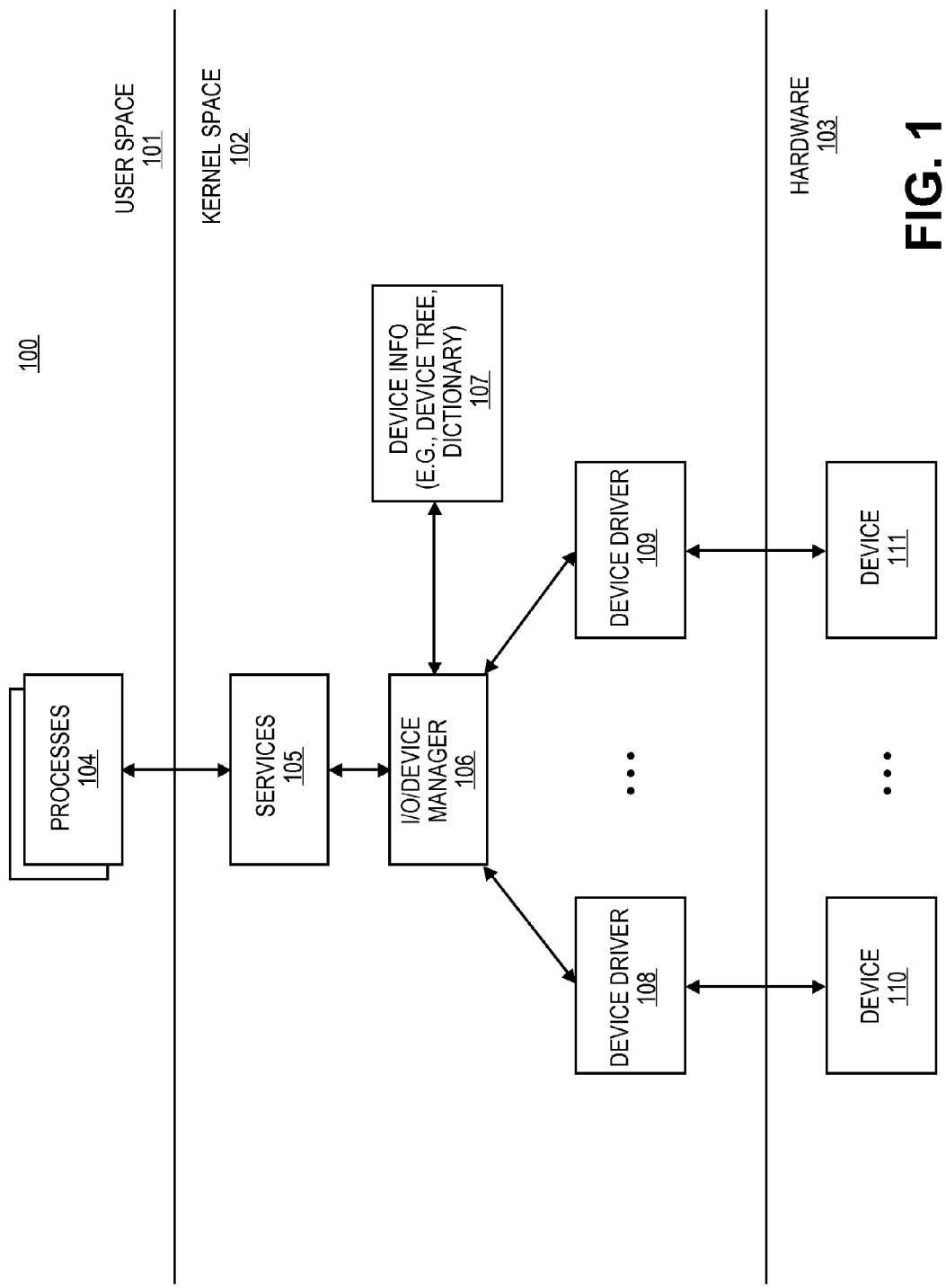
FIG. 1 is a block diagram illustrating a system configuration according to one embodiment of the invention.

FIG. 1 is a block diagram illustrating a system configuration according to one embodiment of the invention. FIG. 1 illustrates a simplified diagram of the interaction between a client process and an operating system having an I/O system that uses device drivers for processing I/O requests. This diagram is representative, for example, of Mac OS from Apple Computer or Windows operating system from Microsoft Corporation. The diagram of FIG. 1 may also represent any operating system which uses device drivers for processing I/O requests.

Referring to FIG. 1, according to one embodiment, system configuration 100 includes an operating system environment having a user space 101 (also referred to as user mode) and a kernel space 102 (also referred to as kernel mode) to allow certain software components to communicate with certain hardware components (e.g., devices) installed in hardware space 103. For example, client process 104 makes use of operating system services 105 to perform I/O requests. This is typically achieved by client process 104 making a call to an application program interface (API) function provided by the operating system. Calling the appropriate API function ultimately results in a call to operating system services 105.

Client process 104 is illustrated as operating in "user" mode and the operating system surfaces are illustrated as operating in "kernel" mode. Modern operating systems typically provide a robust environment for various application programs and intuitive user interfaces. Such operating systems normally have different operating levels or "modes," depending on the level of sophistication of the operating system and the security features that are implemented by the operating system. Normal application programs typically run at the lowest priority and have a full complement of security devices in place to prohibit interference with other applications, or with other layers of the operating system.

Hardware and other services provided by the operating system are accessed through controlled interfaces or mechanisms which limit the ability of a user application or other process in the user mode to "crash" the system. This lowest priority mode is typically referred to as a user mode and is the mode that most computer users are familiar with. Because of the close integration of drivers with their associated hardware and because of the time critical nature of the tasks that many drivers perform, drivers typically run in an operating system mode that has a much higher priority and a much lower security protection. This mode is generally referred to as a "kernel" mode. Placing the drivers and other operating system services in the kernel mode allows the operating system to run at a higher priority and perform many functions that would not be possible from user mode.

Referring back to FIG. 1, when client process 104 makes a call to OS services 105, the call is routed to one of the device drivers 108-109 via Device Manager 106 (also referred to as an I/O manager). In addition, device manager 106 maintains a device information base 107. Device information base 107 is used to store any information regarding device drivers 108-409 and the associated devices 110-111. For example, device information base 107 may include a data structure, such as, for example, a device tree having multiple nodes in a hierarchical structure, where each node represents a device (e.g., devices 110-111) installed within the system 100. Each node may be associated with a device driver (e.g., device drivers 108-109) that supports the associated device.

In one embodiment, the information stored in device information base 107 may be initially stored in a storage, such as, for example, ROM, of the system 100. When system 100 is initialized (e.g., boot), the information is read from the storage to construct a data structure loaded in a memory (e.g., main memory or RAM), also referred to as a device tree plane. In addition, during the initialization, each node of the data structure is processed to identify a proper device driver to be associated with the respective node. The data structure having each node matched with a proper device driver is referred to as a service plane. Note that throughout this application, a device tree is used as an example of a data structure for storing relationship amongst the devices installed in the system. However, it is not so limited; other types of data structures may also be utilized.

Figure 2:
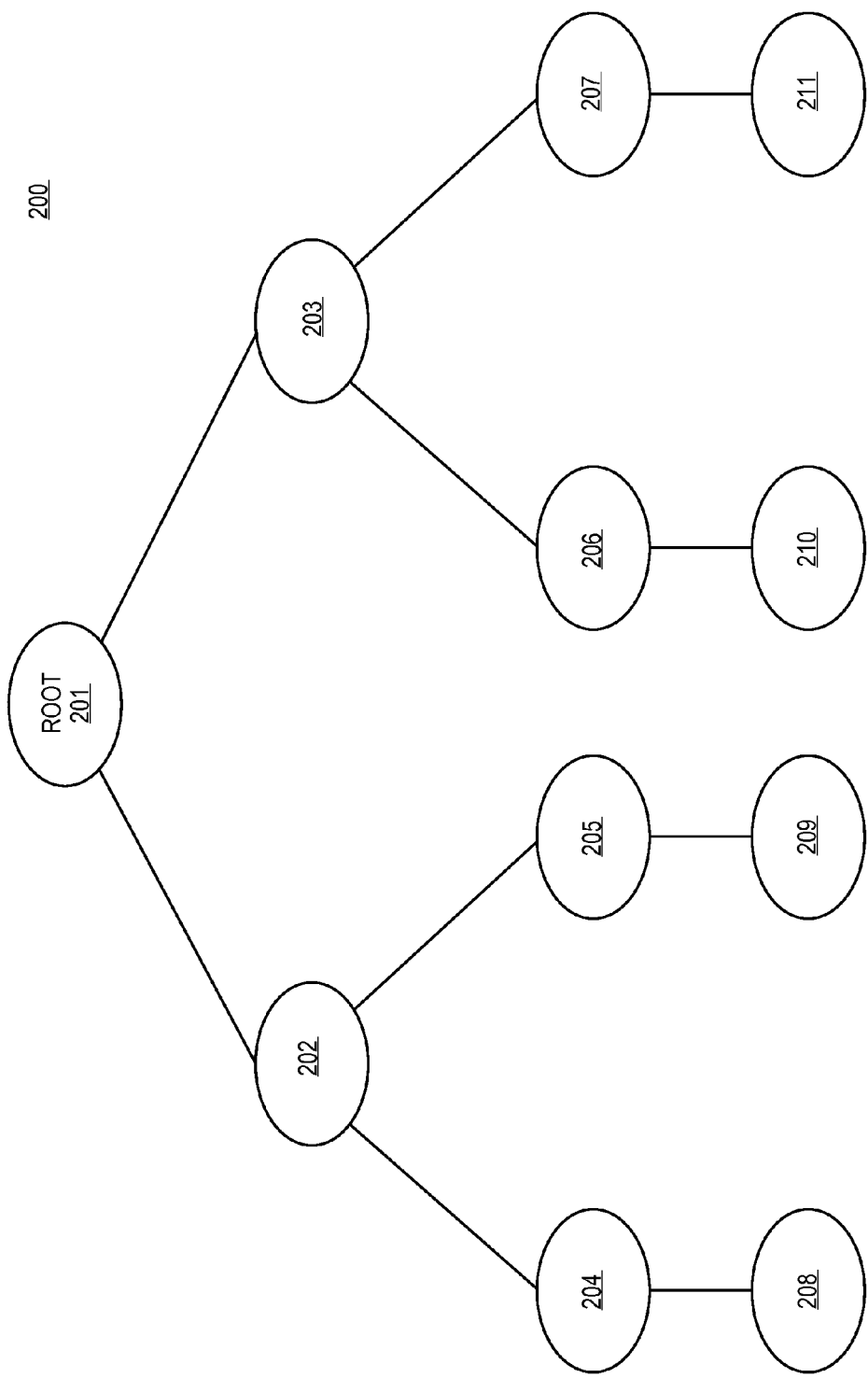
FIG. 2 illustrates a logical representation of a simplified device tree database according to one embodiment of the invention.

FIG. 2 illustrates a logical representation of a simplified device tree database according to one embodiment of the invention. This device tree 200 is a database stored in computer memory as is a hierarchical tree composed of device nodes such as nodes 201-211. This device tree 200 is constructed during the initialization of the system 100 of FIG. 1 (e.g., during "boot") and may be altered thereafter. A number of different procedures can be used within the present invention to generate a listing of devices coupled within the computer system 100. One such procedure is the IEEE 1275 firmware procedure that is used by one embodiment of the present invention.

The device tree 200 begins as a single root node 201 that may represent the CPU's memory bus. All I/O buses and attached devices are assumed to descend from this single root or "node" 201. Layers descending the device tree 200 are dependent on the operation of devices associated with nodes above them. Buses are parent nodes and devices for the leaf nodes of the device tree 200. A complete device tree 200 represents the device topology of the computer system. A bus node in the device tree represents an I/O address space. Each device on a bus operates within the address space supported by its parent bus. Buses also contain information regarding interrupts, so that a device can request service from a driver. It is appreciated that drivers of embodiments of the present invention are matched to devices, but not to buses. In the device tree 200, buses can lead to other buses. A node of the device tree 200 that corresponds to a device is called a "device node." Devices added to the computer system will be added to the device tree 200 upon initialization of the computer system.

Embodiments of the invention use information described above in a service plane which is essentially a copy of pertinent information obtained from the device tree 200 with an associated driver associated with each device.

Referring to FIG. 2, an exemplary device tree 200 may be generated by firmware upon the initialization of the computer system 100 of FIG. 1. While a portion of the information contained in the device tree 200 is utilized by the embodiments of the invention, the actual (complete) copy of the device tree 200 as generated by the firmware needs to be used. At system initialization, devices communicate their presence to firmware which cooperates with the operating system to construct the device tree 200 (also referred to as a device tree plane). Information of the device tree 200 used by the present invention can be constructed under the IEEE 1275 standard which is well known in the art and is not described herein. The device tree 200 can be modified by the computer system's operating system from time to time as required or instructed. Note that device tree 200 is shown for the purposes of illustration only. Other formats or architectures may also be utilized.

Figure 3A:
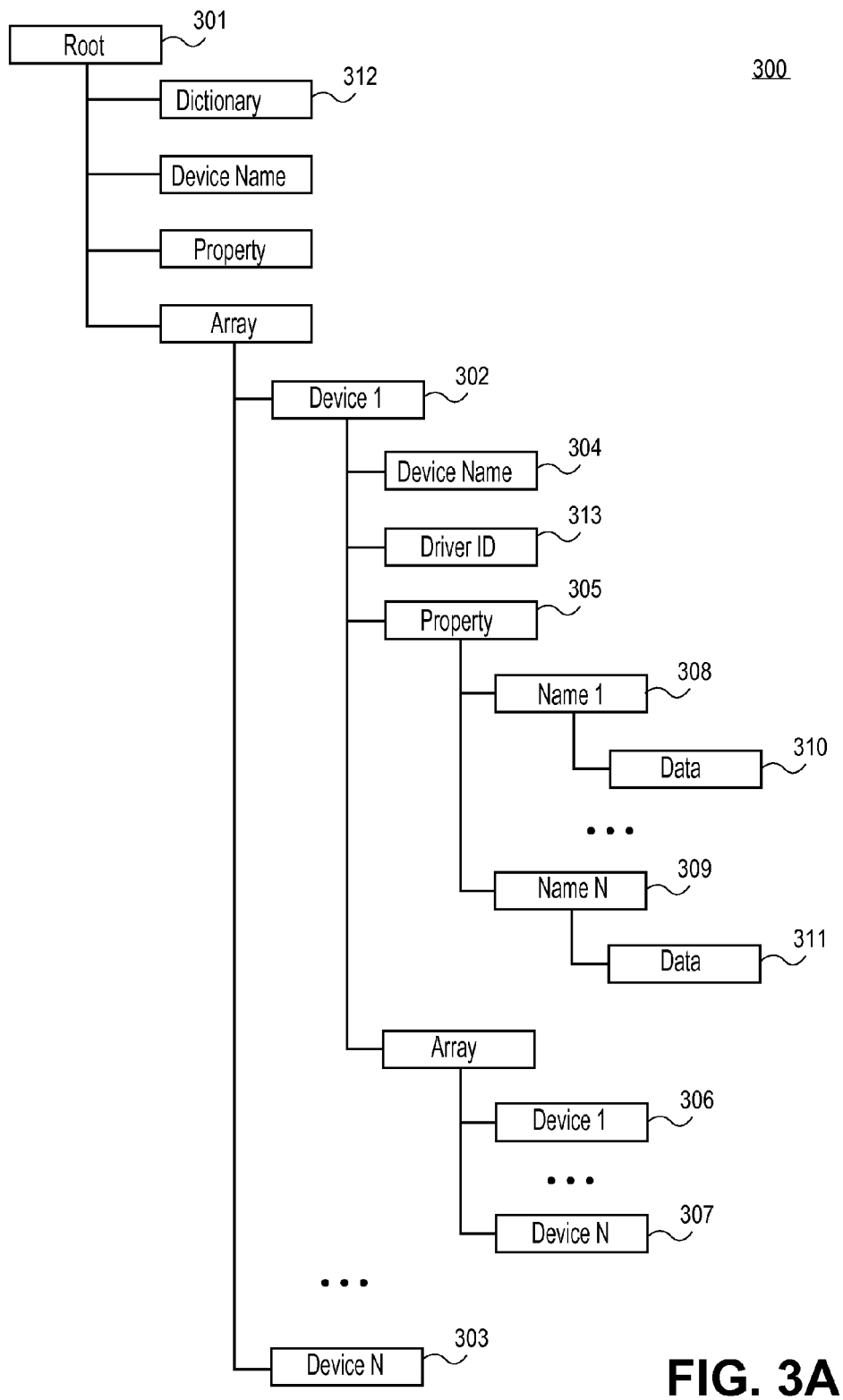
FIG. 3A is a block diagram illustrating a data structure representing a device tree according to one embodiment.

FIG. 3A is a block diagram illustrating a data structure representing a device tree according to one embodiment. For example, data structure 300 may be used to represent device tree 200 of FIG. 2. Referring to FIG. 3A, data structure 300 includes multiple fields or attributes to represent each of the devices installed in the system such as, for example, each device node as shown in FIG. 2. Data structure 300 includes a root device 301 which may represent device 201 of FIG. 2. As described above, a root device may represent a CPU, a chipset, or both of a computer system. In addition, data structure 300 includes multiple child devices 302-303 and 306-307 under the root device 301. For example, child devices 302-303 may represent some of device nodes 204-207 of FIG. 2, while child devices 306-307 may represent some of device nodes 208-211 of FIG. 2.

Each device includes a device name for identifying a corresponding device in a device name space and one or more properties specifying information associated with the respective device. For example, device 302 includes a device name 304 and a property attribute having a property field 305 having one or more properties. Each property is identified by a property name (e.g., property names 308-309) and property data (e.g., data fields 310-311), similar to a key-value pair configuration.

Data structure 300 may be presented to the operating system and drivers by associated descriptive pieces of data (e.g., properties) that are within each node. A device name may be used as a primary basis for matching a driver to a device. A name property may be implemented as a null-terminated string of characters or alternatively, by a UUID (universally unique identifier) or GUM (global unique identifier). Device nodes may also contain a property that indicates compatible devices (not shown) to the corresponding device name.

Referring to FIG. 3A, root device 301 may further include an optional dictionary 312 for storing relationship between a device and a handle of the associated device driver. An example of a dictionary is shown in FIG. 3B. Alternatively, dictionary 312 may be implemented as a separate data structure or table accessible by the root device 301. Further, each device such as device 302 may further include an optional driver field 313 to store a handle of a corresponding driver supporting the respective device. Alternatively, the driver handle 313 may be specified via dictionary 312 as shown in FIG. 3B. Note that the data structure 300 is shown for the purposes of illustration only. Other formats or architectures may also be utilized.

FIG. 3B is a block diagram illustrating a data structure representing an example of a dictionary, such as, for example, dictionary 312 of FIG. 3A. In one embodiment, dictionary 350 includes multiple entries, each corresponding to a unique device installed in the system supported by a unique driver. In one embodiment, each entry includes a first field 351 to store a device identifier and a second field 352 to store a driver identifier of a device driver supporting the device identified by the first field 351. A device identifier may be a device name or UUID/GUID. A driver identifier may be a handle of a device driver, also referred to as a pointer pointing to a memory location of a device driver currently loaded in memory (e.g., an entry point of the driver loaded in certain areas of the main memory).

According to one embodiment, dictionary 350 may be constructed during initialization of a computer system or operating system. In a particular embodiment, when the system is initialized (e.g., boot), a device tree stored in a storage (e.g., ROM) is fetched to form a device tree plane. For each device identified in the device tree plane, the identified device is checked against each entry of the dictionary. An identifier of the device (e.g., device name or UUID/GUID) may be inserted into the first field 351. In addition, a matched device driver is identified loaded and its driver handle is inserted into the second field 352. Note that the data structure 350 is shown for the purposes of illustration only. Other formats or architectures may also be utilized.

According to one embodiment, root device 301 may maintain an API to allow any of the child devices to inquire whether there is another driver or another instance of a driver supporting the same device. As described above, certain devices may be supported by the same driver. However, under certain circumstances, only one instance of the same driver is allowed to load. In one embodiment, when a first instance of a device driver is initialized in preparing to be loaded, the first instance of the driver calls the API, in this example, the root device, to determine whether a second instance of the same driver has already been loaded.

In response, a function providing the API performs a lookup operation into the dictionary to determine whether a second instance of the same driver has been loaded. In one embodiment such a function may be part of a kernel function. Alternatively, such a functionality may be provided by a dedicated component of an operating system. For example, the kernel may look up based on a device name provided by the first instance and based on the device name, to determine whether a driver handle exist in the corresponding second field 352. If the corresponding second field 352 is empty, it means that no driver has been loaded for this device. The kernel may insert the driver handle of the first instance into the corresponding second field 352 indicating the first instance of driver has been loaded. Otherwise, according to one embodiment, the kernel may return a driver handle from the corresponding second field 352 indicating another instance of the same driver has been loaded. Based on a result of calling the API, the first instance driver may act properly, such as, for example, unload itself. Other configurations may exist.

Figure 4A:
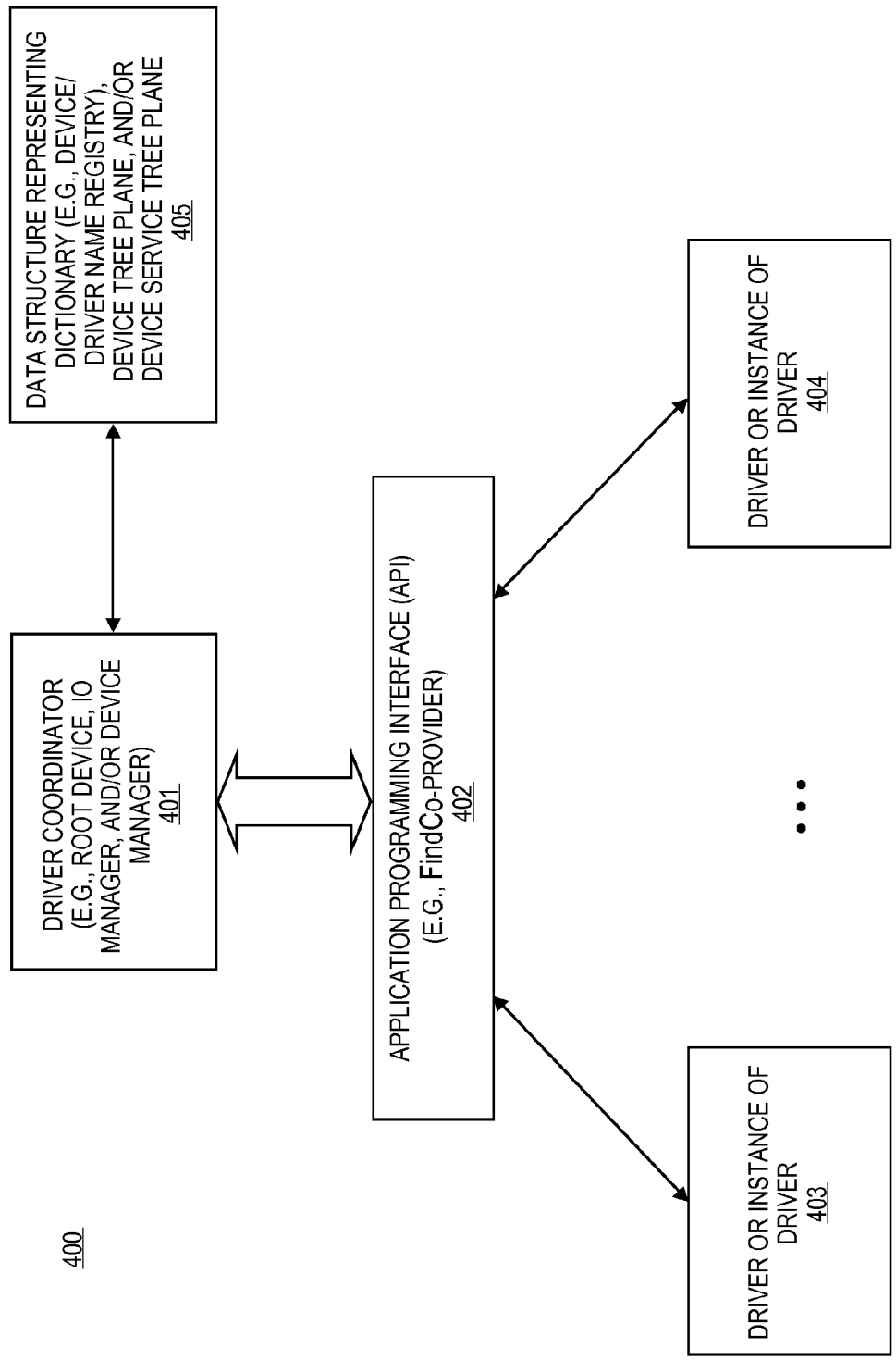
FIG. 4A is a block diagram illustrating a system configuration according to one embodiment.

FIG. 4A is a block diagram illustrating a system configuration according to one embodiment of the invention. For example, system 400 may be implemented as part of system 100 of FIG. 1. Referring to FIG. 4A, system 400 includes a driver coordinator 401 communicating with one or more drivers or instances of drivers 403-404 via an API 402. For example, driver coordinator 401 may be a root device of a device tree, such as, for example, root device 201 of device tree 200 as shown in FIG. 2. Alternatively, driver coordinator 401 may be a kernel component of an operating system, such as, for example, an IO manager or a device manager. In one embodiment, driver coordinator 401 maintains an API 402 to allow any of the drivers or instances of drivers 403-404 to determine whether there is another related driver.

For example, for illustration purposes only, a first instance 403 of a driver may invoke API 402 to communicate with component 401 in an attempt to determining whether there is another instance of the same driver existing or already started. When instance 403 calls the API 402, it passes its device identifier (e.g., device name or UUID/GUID associated with the device) to the driver coordinator 401. In one embodiment, the first instance 403 may retrieve its device identifier from a corresponding device node of device tree 405 which may be implemented in a data structure representing at least a portion of a device tree such as device tree 200 of FIG. 2. In response to the calling of the API 402, driver coordinator 401 may perform a lookup operation into data structure 405 to determine whether another instance of the same driver has been loaded or started. If there is another instance of a driver has been started, driver coordinator 401 may return a driver identifier (e.g., driver handle) of the existing driver to the caller. Otherwise, driver coordinator 401 may insert caller's driver identifier into the data structure 405.

According to certain embodiments of the invention, API 402 may also be used by drivers or instances of drivers 403-404 to communicate with each other, based on information stored within a device tree (e.g., data structure 405). For example, one driver or driver instance may communicate with another driver or driver instance based on the information stored within a device tree or data structure.

Figure 4B:
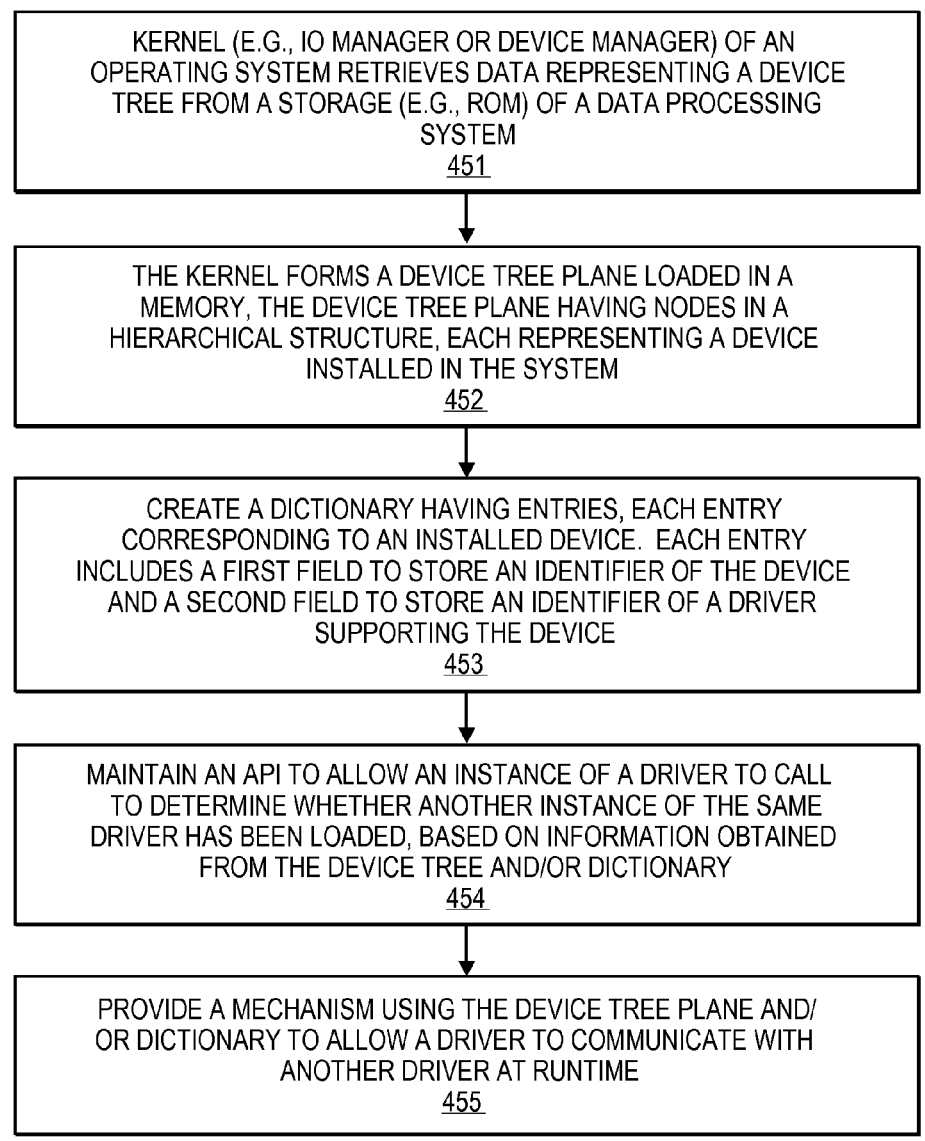
FIG. 4B is a flow diagram illustrating a process for managing device drivers according to one embodiment of the invention.

FIG. 4B is a flow diagram illustrating a process for managing device drivers according to one embodiment of the invention. Note that process 450 may be performed by processing logic which may include software, hardware, or a combination of both. For example, process 450 may be performed by a kernel (e.g., IO manager or device manager) of an operating system of a data processing system such as system 100 of FIG. 1 or system 400 of FIG. 4A.

Referring to FIG. 4B, at block 451, data representing a device tree is retrieved from a storage, such as, for example ROM (read-only memory) of a data processing system. The device tree includes multiple device nodes and each node represents a device installed in the system. The data may be retrieved by a kernel component of an operating system, such as, for example, IO manager or device manager. The data may be retrieved via IEEE 1275 protocol. Note that the retrieved data may not necessarily in a tree style structure. Other configurations may also be utilized.

In response to the data representing a device tree, at block 452, the kernel forms a device tree plane based on the data retrieved from the storage and loads the device tree plane in memory (e.g., main memory or RAM). At block 453, the kernel creates a dictionary or data structure having entries, each entry corresponding to a device. Each entry includes a first field to store an identifier of a device (e.g., device name or UUID/GUID) and a second field to store an identifier of a driver (e.g., driver handle or pointer) associated with the device. At block 454, the kernel maintains an API to allow an instance of a driver to call in order to deter mine whether another instance of the driver has been loaded or started, based on information obtained from the device tree plane and/or dictionary. At block 455, the kernel also provides a mechanism based on the device tree plane and/or dictionary to allow a driver to communicate (e.g., invocation) with another driver at runtime. Other operations may also be performed.

Figure 5A:
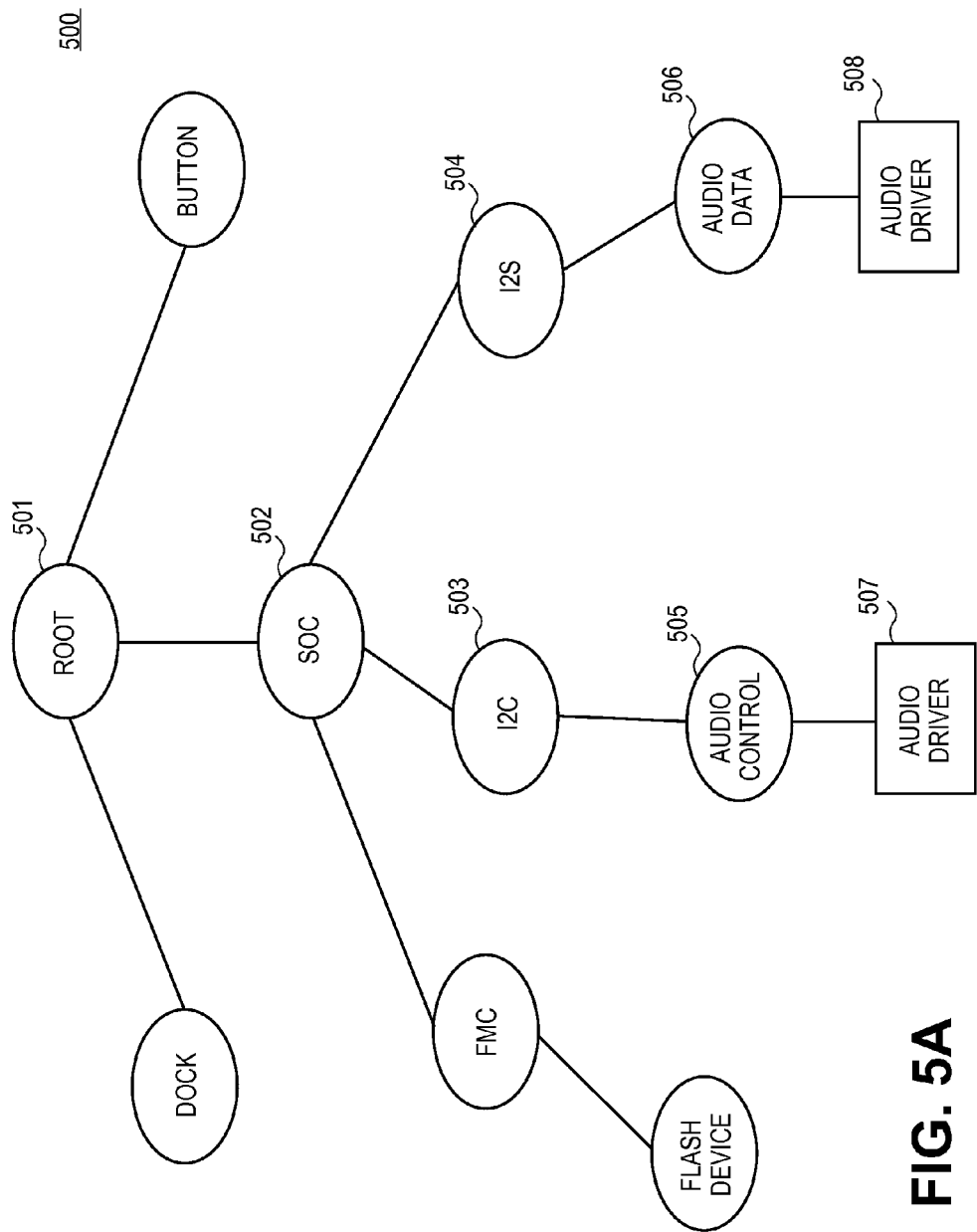
FIG. 5A illustrates an example of a device tree, device tree plane, and/or a service plane according to one embodiment.
Figure 5B:
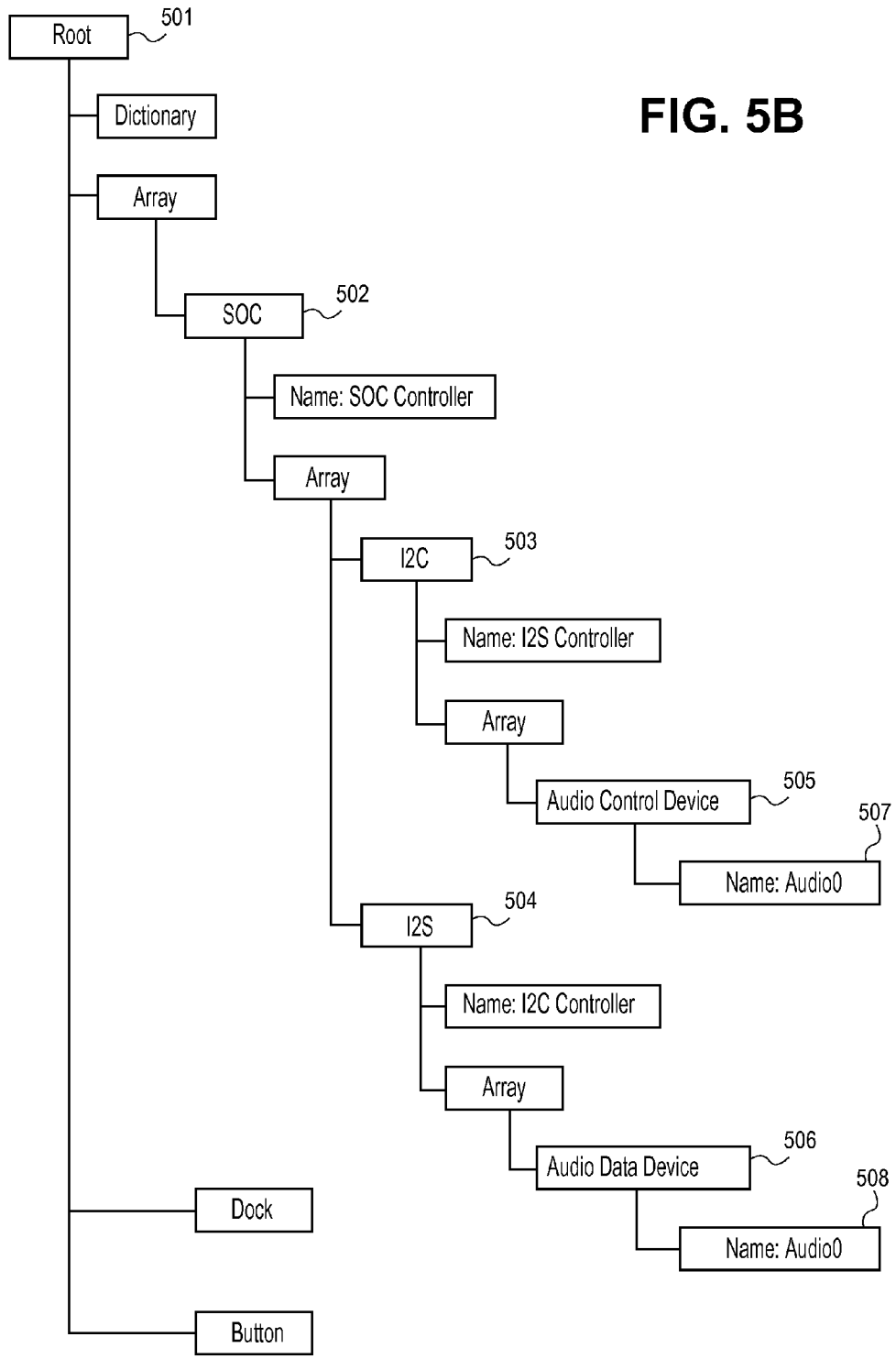
FIG. 5B is a diagram illustrating a data structure representing device 500 of FIG. 5A.

FIGS. 5A-5C are diagrams illustrating an example of a system configuration according to one embodiment. Note that FIGS. 5A-5C are shown and described for illustration purposes only. FIG. 5A illustrates an example of a device tree, device tree plane, and/or a service plane according to one embodiment. Referring to FIG. 5A, device tree 500 includes a root device 501 having multiple child devices, such as, for example, SOC (system on a chip) device 502. Device 502 also includes multiple child devices, such as, for example, I2S (integrated interchip sound) device or controller 504 and I2C (inter-integrated circuit) device or controller 503. The I2S controller 504 has one or more child devices, such as, for example, an audio control device 506. The I2C controller 503 has one or more child devices, such as, for example, an audio data device 505.

In this example, audio control device 505 is responsible for handling audio control signals while audio data device 506 is responsible for handling audio data signals. Although audio control device 505 and audio data device 506 are considered as two devices; they may be supported or serviced by the same audio driver 507. FIG. 5B is a diagram illustrating a data structure representing device 500 of FIG. 5A. As shown in FIG. 5B, both audio control device 505 and audio data device 506 have a name property (e.g., properties 507-508) of "Audio0" to indicate they are associated with the same device driver. FIG. 5C is a block diagram illustrating the corresponding dictionary maintained by the kernel. As shown in FIG. 5C, there is only one entry corresponding to the name of "Audio0".

During initialization of the system, for the illustration purposes, as the kernel of an operating system "walks" through the device tree 500, a driver or an instance of a driver associated each device node is launched and initialized. For example, when audio control device 505 is initialized, a first instance of audio driver 507 associated with audio control device 505 is launched. The first instance may invoke the API (e.g., FindCo-provider) provided by the kernel to determine whether there is another instance of the same driver, in this example, a second instance of driver 507 associated with audio data device 506. In this example, if the second instance of the audio driver has already been launched, the corresponding entry of the dictionary as shown in FIG. 5C should have already included a driver handle of the second instance. As a result, the invocation of the API may return the driver handle of the second instance.

On the other hand, if there is no existing driver instance registered with the dictionary, the kernel may insert the driver handle of the first instance into the corresponding entry of the dictionary. Based on the result of the invocation of the API, the first instance can decide whether the respective instance should continue to start. In one embodiment, when the first instance of the audio driver determines that, based on calling the API (e.g., FindCo-provider), the second instance of the audio driver has already been loaded, the first instance may unload itself. As a result, only instance of the same driver will be loaded in the memory.

Figure 6A:
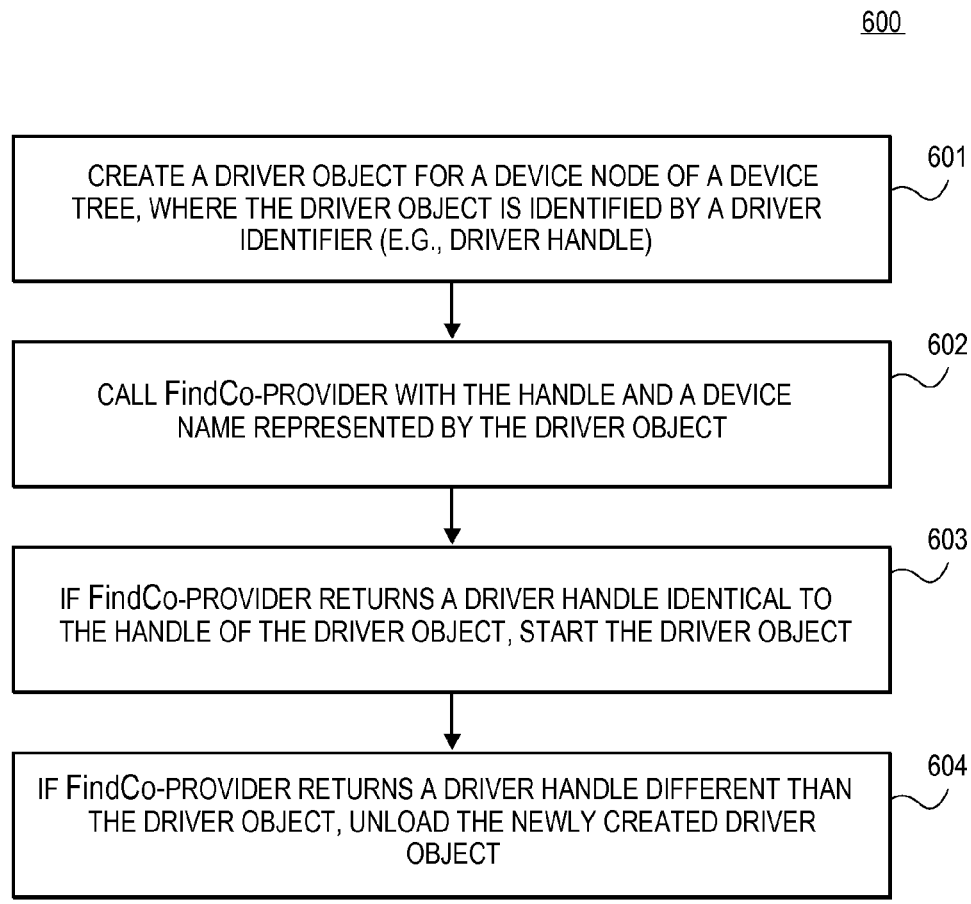
FIG. 6A is a flow diagram illustrating a process performed by an instance of a driver according to one embodiment.

FIG. 6A is a flow diagram illustrating a process performed by an instance of a driver according to one embodiment. Note that process 600 may be performed by processing logic which may include software, hardware, or a combination of both. For example, process 600 may be performed by the kernel when initializing a device driver. Referring to FIG. 6A, at block 601, the kernel creates a new driver object for a node of a device tree, where the new driver object is identified by an identifier (e.g., driver handle or pointer). At block 602, the kernel calls an initialization routine of the new driver object which invokes an API of the kernel (e.g., FindCo-provider) to deter nne whether there is another driver instance has been already loaded. At block 603, if there is no other driver instance existing, the kernel starts the new driver object. Otherwise, at block 604, the kernel unloads the newly created driver object.

Figure 6B:
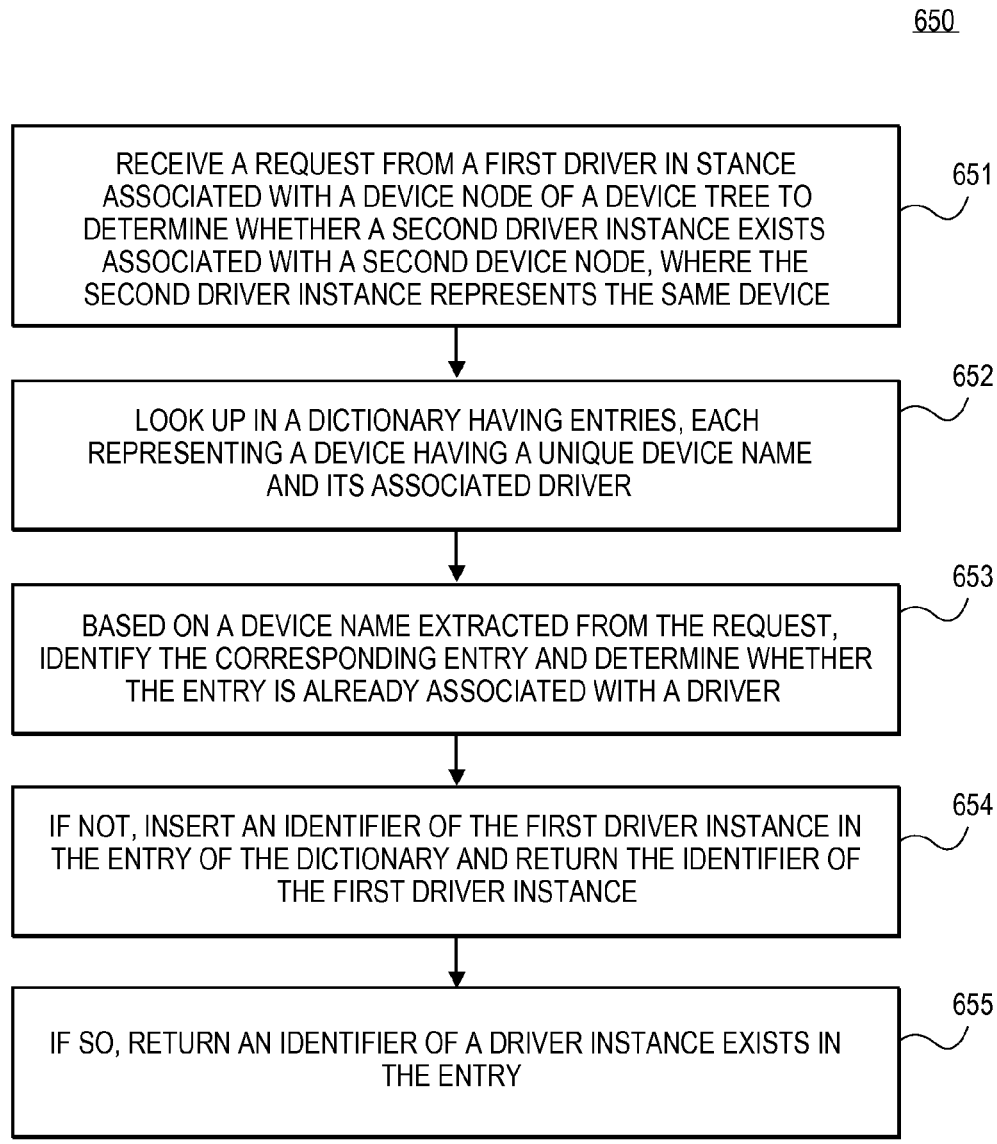
FIG. 6B is a flow diagram illustrating a process of an API of a kernel according to one embodiment of the invention.

FIG. 6B is a flow diagram illustrating a process of an APT of a kernel according to one embodiment of the invention. Note that process 650 may be performed by processing logic which may include software, hardware, or a combination of both. For example, process 650 may be performed by the kernel to provide an API (e.g., FindCo-provider) to enable device drivers to determine whether there is an instance of a driver has been started. Referring to FIG. 6B, at block 651, the kernel receives, as part of an API, a request from a first driver instance associated with a first device node of a device tree to determine whether a second driver instance associated with a second device node exists. The first and second device nodes are supported by the same driver. At block 652, the kernel performs a lookup operation in a dictionary having entries, where each entry representing a device having a unique device name and its associated driver. At block 653, based on a device name extracted from the request, the kernel identifies the corresponding entry and determine whether the entry is already associated with a driver (e.g., the corresponding entry includes a driver handle of the driver). At block 654 if there is no driver handle exists, insert an identifier of the first driver instance in the entry of the dictionary and returns the identifier of the first driver instance. Otherwise, at block 655, the kernel returns the driver identifier exists in the dictionary. Other operations may also be performed. FIGS. 7A-7D illustrate pseudo codes of certain routines representing at least some of the operations described above.

According to certain embodiments of the invention, certain properties of a device node in a device tree may be used to encode information regarding another device node and/or a device driver of that device node. As a result, a driver of a first device node may invoke or communicate with a driver of a second device node using property information retrieved from the device tree. For example, based on the information retrieved from a device tree, a first driver may communicate with the kernel to receive a driver handle of a second driver and call the second driver via the driver handle of the second driver. Alternatively, the first driver may instruct the kernel to directly call the second driver based on the information retrieved from the device tree. In these examples, the second driver being called may not need to know who is calling and the first driver does not need to know where to call the second driver. That is, the first driver may know that someone else can help on certain functionality, but it does not know who has the capability of performing such functionality.

Figure 8:
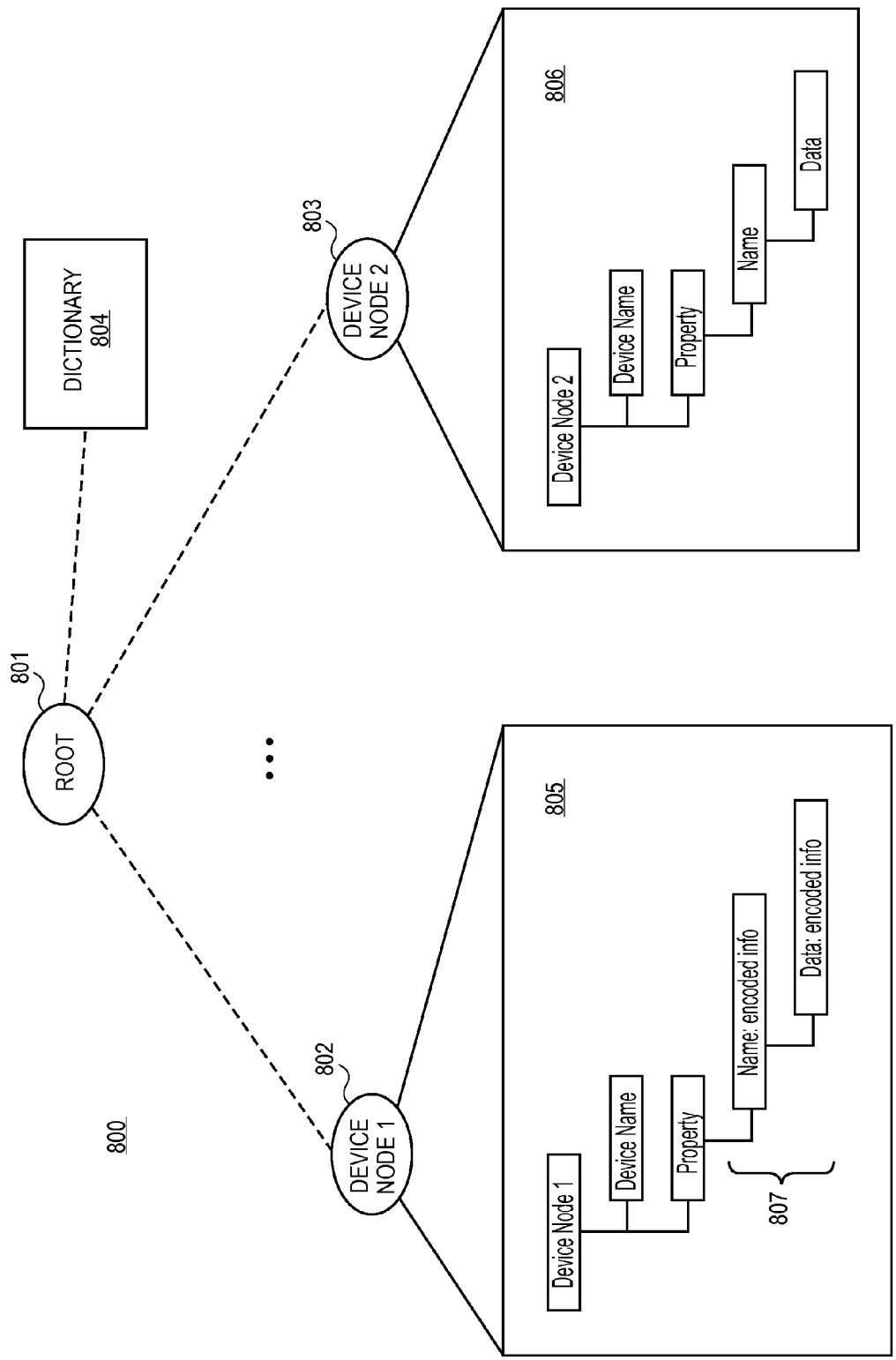
FIG. 8 is a diagram illustrating an example of a device tree where a device node encodes information regarding another device node, according to one embodiment of the invention.

FIG. 8 is a diagram illustrating an example of a device tree where a device node encodes information regarding another device node, according to one embodiment of the invention. Referring to FIG. 8, device tree 800 includes a root device 801 having one or more child device nodes 802-803. Note that there may be one or more device nodes (e.g., intermediate nodes or parent/sub-parent nodes) between device nodes 802-803 and root device 801. Device node 802 is associated with a data structure 805 representing properties or attributes of device node 802. Like wise, device node 803 is associated with a data structure 806 representing properties or attributes of device node 803.

In one embodiment, for example, data structure 805 of device node 802 includes information encoded as part of property 807 regarding another device node 803 and/or a device driver associated with device node 803. Based on the encoded information retrieved from property 807, a driver associated with device node 802 may locate a driver associated with device node 803 and invoke the driver associated with device node 803. This is typically useful when one driver of a device is responsible of certain functionality (e.g., control and data signal communications) while another driver is responsible for other functionality of the same device (e.g. power management or clock signal control).

For example, based on information extracted from property 807, a first driver of first device node 802 may communicate with the root device 801 or kernel to locate a second driver of device node 803. In a particularly, embodiment, property 807 may include an identifier regarding device node 803, such as, for example, a device name. When the first driver needs to invoke the second driver, although the first driver does not know who and where the second driver is, the first driver (or its parent) retrieves the encoded information from the device tree. The first driver then communicates with the kernel with the retrieved information. Based on the information provided by the first driver, the kernel (e.g., root device 801) performs a lookup operation in dictionary 804 to determine a driver identifier (e.g., driver handle) of the second device node 803. The kernel returns the driver handle of device node 803 back to the first driver and thereafter, the first driver may invoke the second driver via the associated driver handle. Alternatively, the kernel may directly invoke the second driver. Other configurations may exist.

Figure 9:
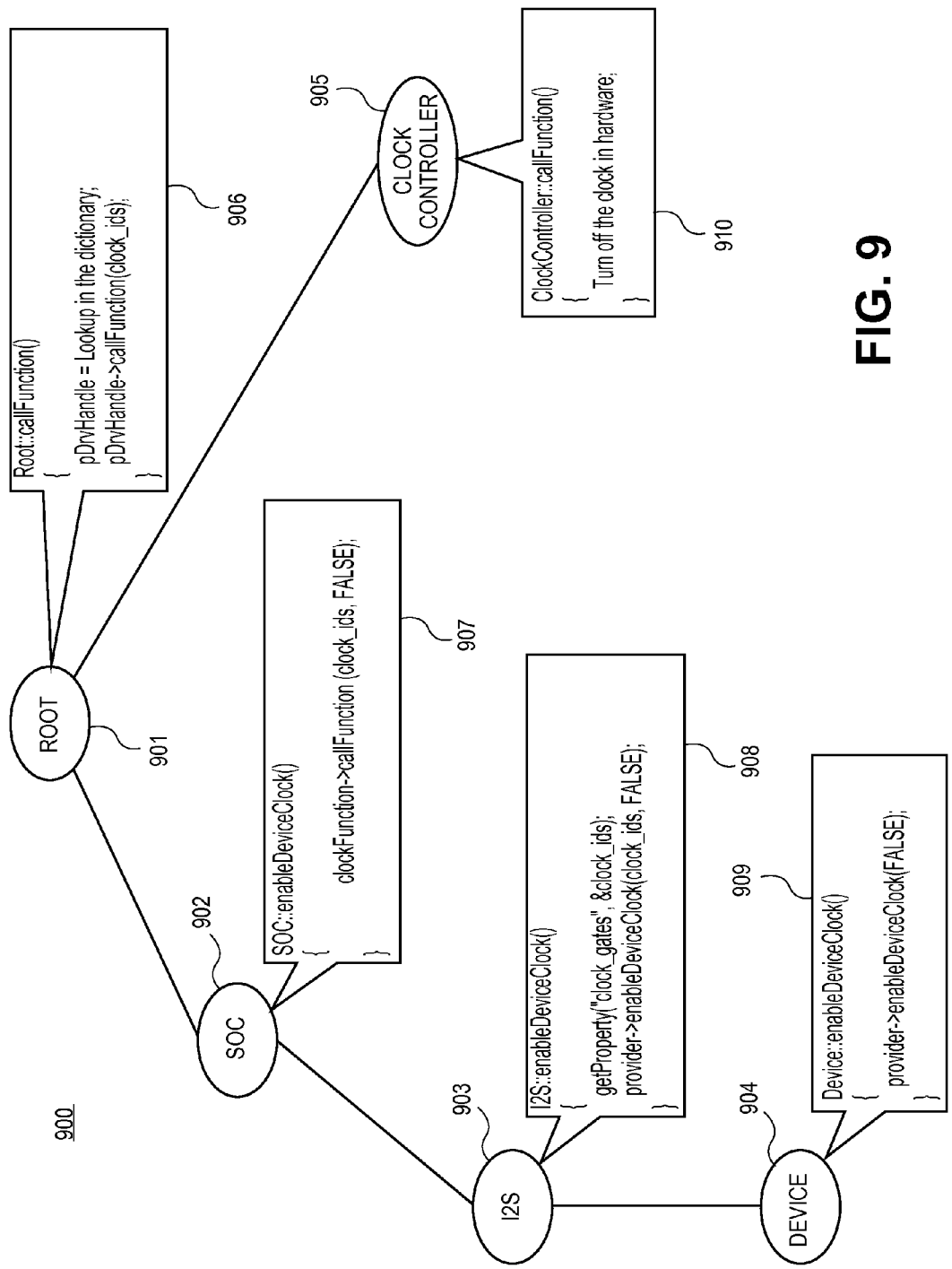
FIG. 9 is a diagram illustrating a particular example of having information encoded within a device node to allow the device node to invoke a driver of another device node, according to one embodiment of the invention.

FIG. 9 is a diagram illustrating a particular example of having information encoded within a device node to allow the device node to invoke a driver of another device node, according to one embodiment of the invention. In this example, device tree 900 is implemented using object oriented techniques which resembles the architecture of the device tree 900. Referring to FIG. 9, device tree 900 includes a root device node 901 having child device nodes 902-904 on one branch and one or more device nodes such as device node 905 on another branch. Each of the device nodes 901-905 is associated with a class of function and data members 906-910.

Note that in this example, C/C++ is used as an example of object oriented programming (OOP) language; however, other OOP languages may also be applied. It will be appreciated that an OOP language is not required to practice embodiments of the invention. Other non-OOP programming languages (e.g., assembly) may also be utilized. Other programming languages (e.g., assembly) may also be utilized. Referring to FIG. 9, when device node 904 needs to invoke a driver 910 of device node 905 to control clock signals of a device associated with device node 904, such as, for example, turning off the clock, its corresponding function member 909 invokes its parent (e.g., "provider") function 908. Within the function 908, the encoded information is retrieved from the device tree (e.g., getProperty). In this example, data of a property of "clock_gates" under device node 903 is retrieved. Thereafter, the parent function 907 of function 908 is invoked which in turn communicates with function 906 of root device node 901. Based on the encoded information retrieved from the device tree, function 906 determines (e.g., via dictionary) a driver handle of driver associated with 905 and the corresponding function member 910. Thereafter, function 910 is called. As a result, a driver associated with device node 904 can invoke a driver associated with device node 905 based on information extracted from the device tree.

Figure 10:
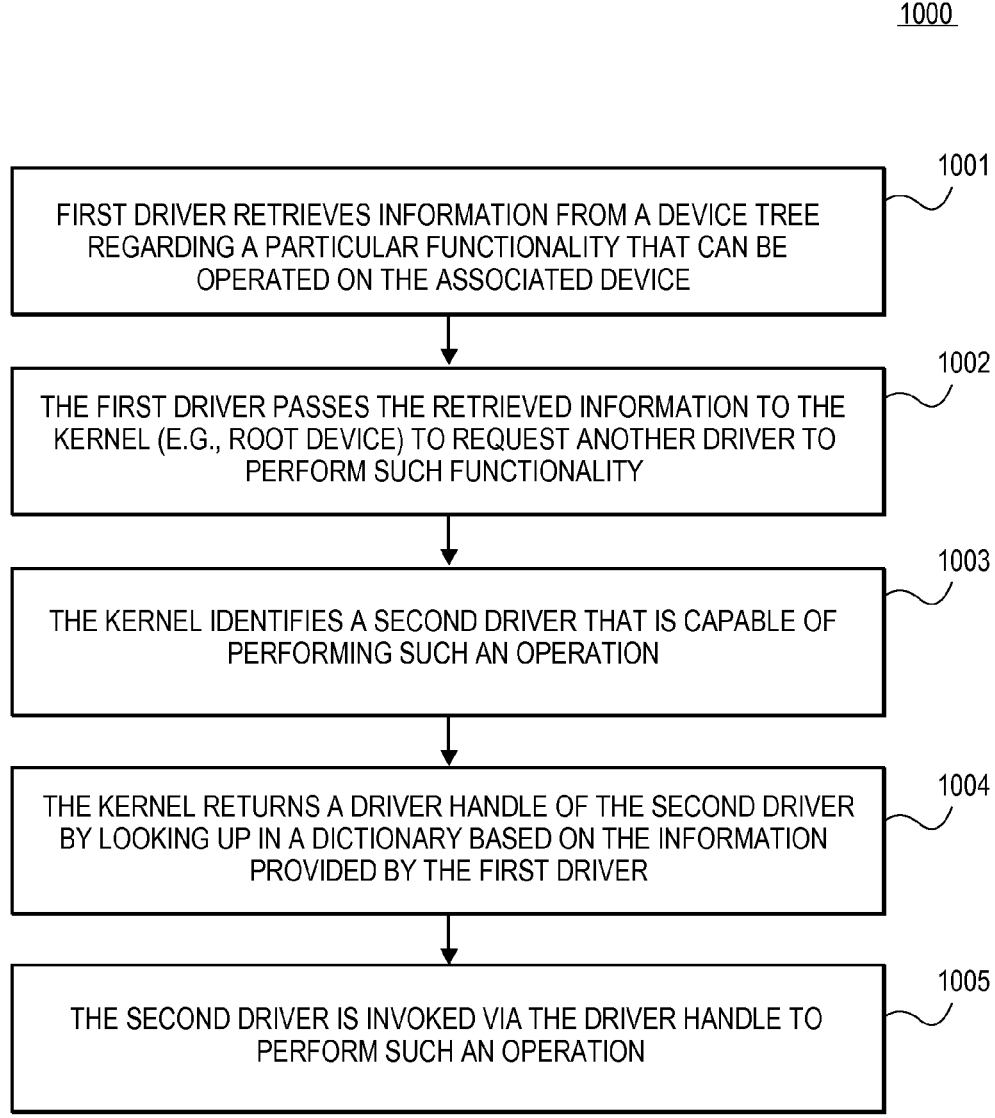
FIG. 10 is a flow diagram illustrating a process that enables a driver to communicate with another driver using a device tree according to one embodiment of the invention.

FIG. 10 is a flow diagram illustrating a process that enables a driver to communicate with another driver using a device tree according to one embodiment of the invention. Note that process 1000 may be performed by processing logic which may include software, hardware, or a combination of both. Referring to FIG. 10, at block 1001, a first driver of a first device node in a device tree retrieves information from the device tree regarding a particular functionality that can be operated on the associated device. At block 1002, the first driver communicates with the kernel of an operating system and provides the retrieved information to the kernel for requesting a driver identified by the information to be invoked. At block 1003, the kernel identifies, via dictionary, a second driver that is capable of perform such functionality based on the provided information. At block 1004, the kernel retrieves a driver handle of the second driver from the dictionary and returns the driver handle to the first driver. At block 1005, the first driver invokes the second driver using the driver handle returned from the kernel. Other operations may also be performed.

Figure 11:
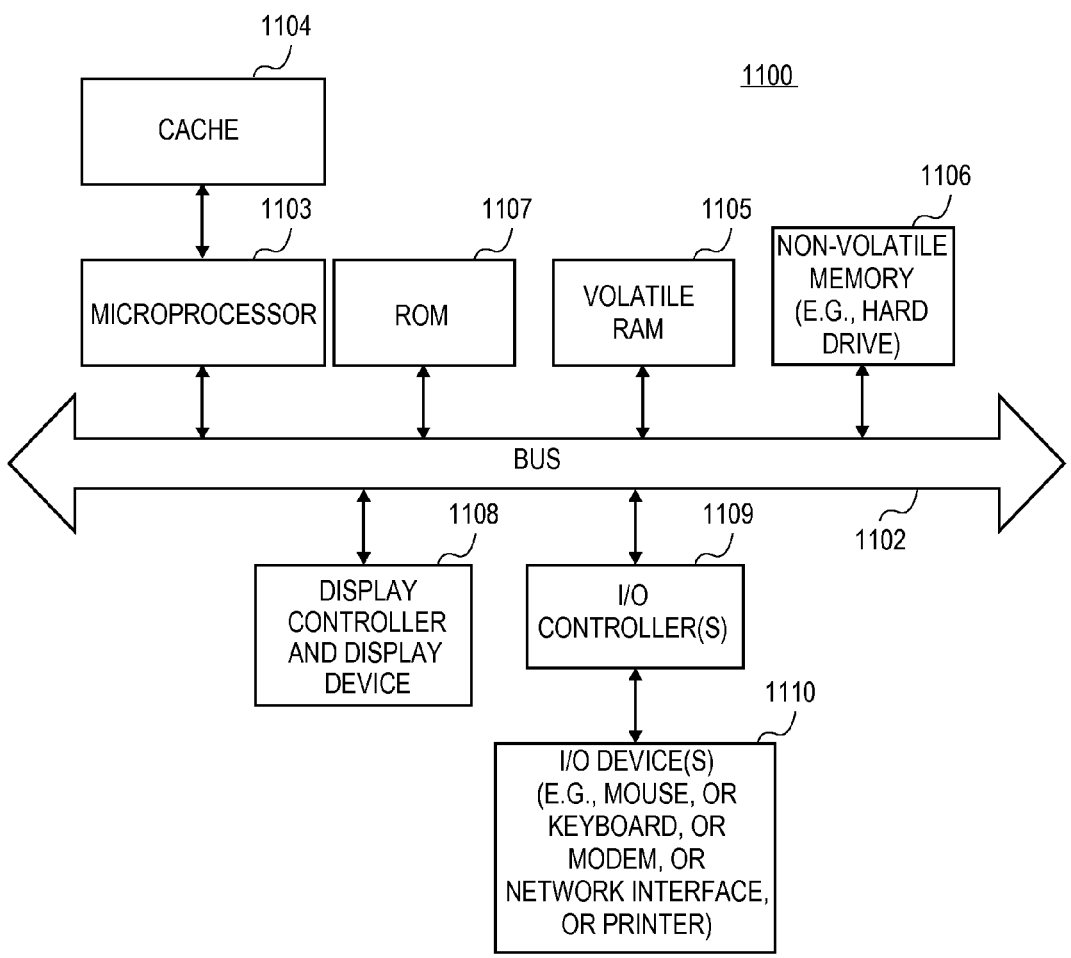
FIG. 11 is a block diagram of a digital processing system, which may be used with one embodiment of the invention.

FIG. 11 is a block diagram of a digital processing system, which may be used with one embodiment of the invention. For example, the system 1100 shown in FIG. 11 may be used as a system as described above with respect to FIGS. 1 and/or 4A. Note that while FIG. 11 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention.

As shown in FIG. 11, the system 1100, which is a form of a data processing system, includes a bus or interconnect 1102 which is coupled to one or more microprocessors 1103 and a ROM 1107, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices.

Figure 12:
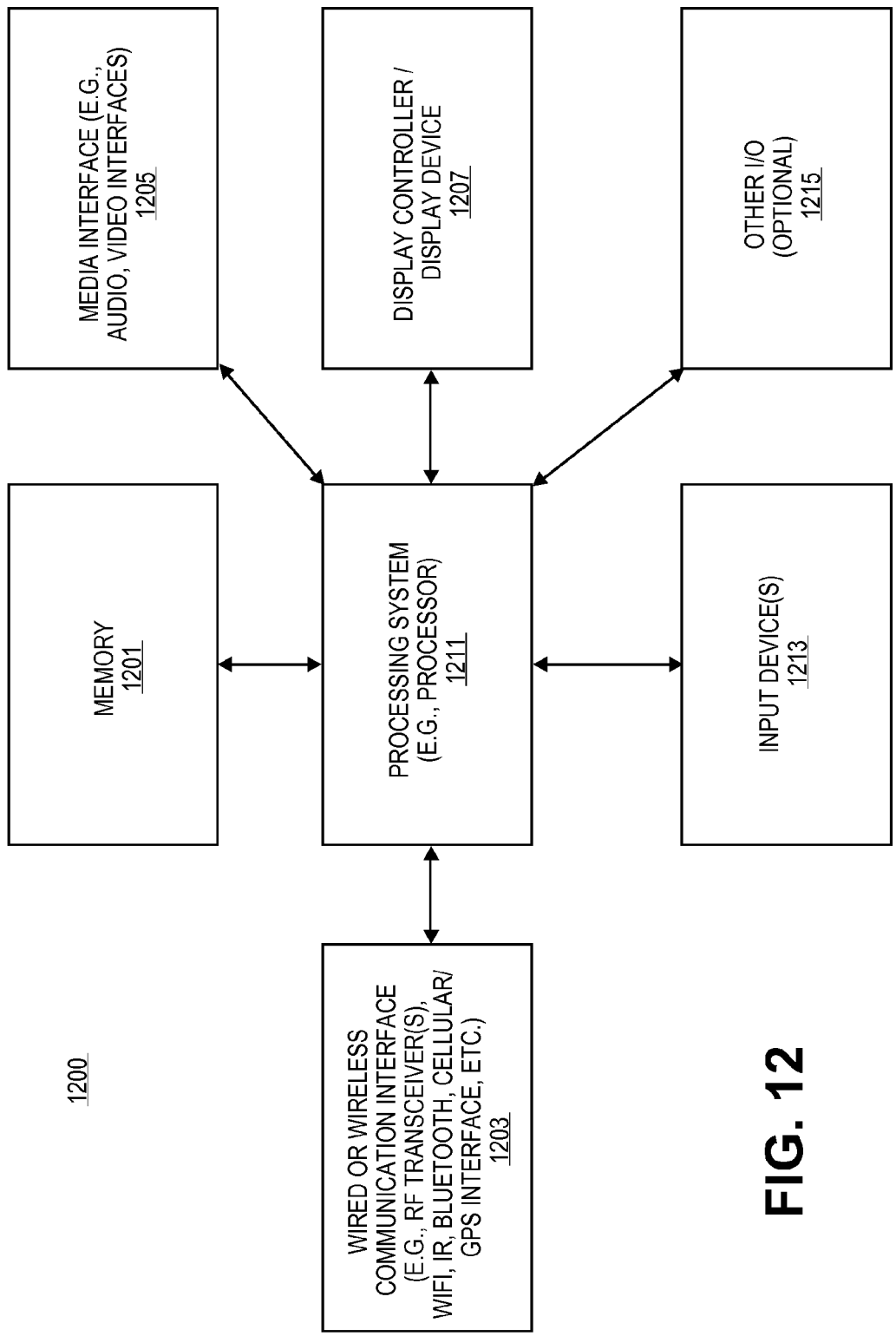
FIG. 12 is a block diagram of a digital processing system, which may be used with another embodiment of the invention.

FIG. 12 is a block diagram of a digital processing system, which may be used with another embodiment of the invention. For example, the system 1200 shown in FIG. 12 may be used as a system as described above with respect to FIGS. 1 and/or 4A. The data processing system 1200 shown in FIG. 12 includes a processing system 1211, which may include one or more microprocessors, or which may be a system on a chip integrated circuit, and the system also includes memory 1201 for storing data and programs for execution by the processing system. The system 1200 also includes a media (e.g., audio/video) input/output subsystem 1205 which may include, for example, a microphone and a speaker for, for example, playing back music or providing telephone functionality through the speaker and microphone. A display controller and display device 1207 provide a visual user interface for the user.

This digital interface may include a graphical user interface which is similar to that shown on a typical computer, such as, for example, a Macintosh computer when running OS X operating system software. The system 1200 also includes a communication interface (e.g., wired or wireless communication interface) 1203, such as, for example, one or more wireless transceivers to communicate with another system or device. A wireless transceiver may be a WiFi transceiver, an infrared (IR) transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 12 may also be used in a data processing system.

The data processing system 1200 also includes one or more input devices 1213 which are provided to allow a user to provide input to the system. These input devices may be a keypad or a keyboard or a touch panel or a multi touch panel. Alternatively, input devices 1213 may include a voice interactive interface that can receive and interact with a voice command. The data processing system 1200 also includes an optional input/output device 1215 which may be a connector for a dock. It will be appreciated that one or more buses, not shown, may be used to interconnect the various components as is well known in the art. The data processing system shown in FIG. 12 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1200 may be a network computer or an embedded processing device within another device, or other types of data processing systems which have fewer components or perhaps more components than that shown in FIG. 12.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone (s). Examples of a portable media player are described in published U.S. patent application numbers 2003/0095096 and 2004/0224638, both of which are incorporated herein by reference. Other configurations may exist.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   maintaining within a kernel of an operating system a device tree having a hierarchical structure executed in a memory by a processor of a computer, the device tree having a plurality of nodes corresponding to a plurality of devices installed in the computer, including a first node associated with a first device and a second node associated with a second device;
   encoding within the first node an auxiliary driver identifier for identifying a second device driver associated with the second node and data representing one or more parameters used by a first device driver associated with the first device when invoking the second device driver, wherein the auxiliary driver identifier includes an auxiliary device name associated with the second node of the device tree;
   the first device driver retrieving the auxiliary device identifier and the data representing one or more parameters from the device tree and passing the auxiliary device name and the data to the kernel;
   receiving, at the kernel, a request from the first device driver for invoking the second device driver, the request including the auxiliary driver identifier;
   in response to the request, the kernel identifying a driver handle for the second device driver based on the auxiliary driver identifier, including
   performing a lookup operation in a dictionary, the dictionary having a plurality of entries corresponding to a plurality of devices, wherein each entry includes a first field to store a device name of the device and a second field to store a driver handle of a device driver associated with the identified device,
   locating an entry associated with the second device driver based on at least one of the auxiliary device name and the data representing one or more parameters,
   retrieving a driver handle of the second device driver from the located entry of the dictionary; and
   returning, by the kernel, the driver handle of the second device driver to the first device driver to enable the first device driver to invoke the second device driver by calling the driver handle of the second device driver, including passing the data representing one or more parameters retrieved from the first node of the device tree, to perform a predetermined operation on the first device, wherein the second device driver, when invoked, does not need to know who invokes the second device driver.

2. The method of claim 1, wherein the data representing one or more parameters further indicates how the second device driver should perform the predetermined operation.

3. The method of claim 1, further comprising:
   the kernel retrieving a driver handle of the second device driver from the located entry of the dictionary; and
   the kernel invoking the second device driver via the driver handle by passing at least a portion of the data representing the one or more parameters.

4. The method of claim 3, wherein the second device driver, when invoked, does not need to know who invokes the second device driver.

5. The method of claim 1, further comprising the kernel constructing the dictionary during an initialization of the computer based on device information stored in storage of the computer.

6. A non-transitory machine-readable medium having instructions stored therein, which when executed by a machine, cause the machine to perform a method, the method comprising:
- maintaining within a kernel of an operating system a device tree having a hierarchical structure executed in a memory by a processor of a computer, the device tree having a plurality of nodes corresponding to a plurality of devices installed in the computer, including a first node associated with a first device and a second node associated with a second device; and
- encoding within the first node an auxiliary driver identifier for identifying a second device driver associated with the second node and data representing one or more parameters used by a first device driver associated with the first device when invoking the second device driver, wherein the auxiliary driver identifier includes an auxiliary device name associated with the second node of the device tree;
- the first device driver retrieving the auxiliary device identifier and the data representing one or more parameters from the device tree and passing the auxiliary device name and the data to the kernel;
- receiving, at the kernel, a request from the first device driver for invoking the second device driver, the request including the auxiliary driver identifier;
- in response to the request, the kernel identifying a driver handle for the second device driver based on the auxiliary driver identifier, including
- performing a lookup operation in a dictionary, the dictionary having a plurality of entries corresponding to a plurality of devices, wherein each entry includes a first field to store a device name of the device and a second field to store a driver handle of a device driver associated with the identified device,
- locating an entry associated with the second device driver based on at least one of the auxiliary device name and the data representing one or more parameters,
- retrieving a driver handle of the second device driver from the located entry of the dictionary; and
- returning, by the kernel, the driver handle of the second device driver to the first device driver to enable the first device driver to invoke the second device driver by calling the driver handle of the second device driver, including passing the data representing one or more parameters retrieved from the first node of the device tree, to perform a predetermined operation on the first device, wherein the second device driver, when invoked, does not need to know who invokes the second device driver.

7. The non-transitory machine-readable medium of claim 6, wherein the data representing one or more parameters further indicates how the second device driver should perform the predetermined operation.

8. The non-transitory machine-readable medium of claim 6, wherein the method further comprises:
- the kernel retrieving a driver handle of the second device driver from the located entry of the dictionary; and
- the kernel invoking the second device driver via the driver handle by passing at least a portion of the data representing the one or more parameters.

9. The non-transitory machine-readable medium of claim 8, wherein the second device driver, when invoked, does not need to know who invokes the second device driver.

10. The non-transitory machine-readable medium of claim 6, wherein the method further comprises the kernel constructing the dictionary during an initialization of the computer based on device information stored in storage of the computer.

11. An apparatus, comprising:
- means for maintaining within a kernel of an operating system a device tree having a hierarchical structure executed in a memory by a processor of a computer, the device tree having a plurality of nodes corresponding to a plurality of devices installed in the computer, including a first node associated with a first device and a second node associated with a second device;
- means for encoding within the first node an auxiliary driver identifier for identifying a second device driver associated with the second node and data representing one or more parameters used by a first device driver associated with the first device when invoking the second device driver, wherein the auxiliary driver identifier includes an auxiliary device name associated with the second node of the device tree;
- means for the first device driver retrieving the auxiliary device identifier and the data representing one or more parameters from the device tree and passing the auxiliary device name and the data to the kernel;
- means for receiving, at the kernel, a request from the first device driver for invoking the second device driver, the request including the auxiliary driver identifier;
- in response to the request, means for the kernel identifying a driver handle for the second device driver based on the auxiliary driver identifier, including
- means for performing a lookup operation in a dictionary, the dictionary having a plurality of entries corresponding to a plurality of devices, wherein each entry includes a first field to store a device name of the device and a second field to store a driver handle of a device driver associated with the identified device,
- means for locating an entry associated with the second device driver based on at least one of the auxiliary device name and the data representing one or more parameters,
- means for retrieving a driver handle of the second device driver from the located entry of the dictionary; and
- means for returning, by the kernel, the driver handle of the second device driver to the first device driver to enable the first device driver to invoke the second device driver by calling the driver handle of the second device driver, including passing the data representing one or more parameters retrieved from the first node of the device tree, to perform a predetermined operation on the first device, wherein the second device driver, when invoked, does not need to know who invokes the second device driver.

12. The apparatus of claim 11, wherein the data representing one or more parameters further indicates how the second device driver should perform the predetermined operation.

13. The apparatus of claim 11, further comprising:
- means for the kernel retrieving a driver handle of the second device driver from the located entry of the dictionary; and
- means for the kernel invoking the second device driver via the driver handle by passing at least a portion of the data representing the one or more parameters.

14. The apparatus of claim 13, wherein the second device driver, when invoked, does not need to know who invokes the second device driver.

15. The apparatus of claim 11, further comprising means for the kernel constructing the dictionary during an initialization of the computer based on device information stored in storage of the computer.

16. A data processing system, comprising:
a processor; and
a memory coupled to the processor to store instructions, which when executed from the memory, cause the processor to perform operations, the operations including
  maintaining within a kernel of an operating system a device tree having a hierarchical structure executed in a memory by a processor of a computer, the device tree having a plurality of nodes corresponding to a plurality of devices installed in the computer, including a first node associated with a first device and a second node associated with a second device,
  encoding within the first node an auxiliary driver identifier for identifying a second device driver associated with the second node and data representing one or more parameters used by a first device driver associated with the first device when invoking the second device driver, wherein the auxiliary driver identifier includes an auxiliary device name associated with the second node of the device tree,
  retrieving, by the first device driver, the auxiliary device identifier and the data representing one or more parameters from the device tree and passing the auxiliary device name and the data to the kernel,
  receiving, at the kernel, a request from the first device driver for invoking the second device driver, the request including the auxiliary driver identifier,
  in response to the request, the kernel identifying a driver handle for the second device driver based on the auxiliary driver identifier, including
  performing a lookup operation in a dictionary, the dictionary having a plurality of entries corresponding to a plurality of devices, wherein each entry includes a first field to store a device name of the device and a second field to store a driver handle of a device driver associated with the identified device,
  locating an entry associated with the second device driver based on at least one of the auxiliary device name and the data representing one or more parameters,
  retrieving a driver handle of the second device driver from the located entry of the dictionary, and
  returning, by the kernel, the driver handle of the second device driver to the first device driver to enable the first device driver to invoke the second device driver by calling the driver handle of the second device driver, including passing the data representing one or more parameters retrieved from the first node of the device tree, to perform a predetermined operation on the first device, wherein the second device driver, when invoked, does not need to know who invokes the second device driver.

17. The system of claim 16, wherein the data representing one or more parameters further indicates how the second device driver should perform the predetermined operation.

18. The system of claim 16, wherein the operations further comprise:
  the kernel retrieving a driver handle of the second device driver from the located entry of the dictionary; and
  the kernel invoking the second device driver via the driver handle by passing at least a portion of the data representing the one or more parameters.

19. The system of claim 18, wherein the second device driver, when invoked, does not need to know who invokes the second device driver.

20. The system of claim 16, wherein the operations further comprise the kernel constructing the dictionary during an initialization of the computer based on device information stored in storage of the computer.

* * * * *